US012625940B2

(12) United States Patent
Guyomarc'h et al.

(10) Patent No.: US 12,625,940 B2
(45) Date of Patent: *May 12, 2026

(54) MULTI FACTOR AUTHENTICATION USING DIFFERENT DEVICES

(71) Applicant: ASSA ABLOY AB, Stockholm (SE)

(72) Inventors: François-Eric Michel Guyomarc'h, Clermont (FR); James William Holland, Braishfield (GB); Milan Khan, London (GB); Caleb Wattles, Paris (FR)

(73) Assignee: ASSA ABLOY AB, Stockholm (SE)

( * ) Notice: Subject to any disclaimer, the term of this patent is extended or adjusted under 35 U.S.C. 154(b) by 203 days.

This patent is subject to a terminal disclaimer.

(21) Appl. No.: 18/458,520

(22) Filed: Aug. 30, 2023

(65) Prior Publication Data

US 2023/0409693 A1    Dec. 21, 2023

Related U.S. Application Data

(63) Continuation of application No. 16/339,309, filed as application No. PCT/IB2017/001362 on Oct. 4, 2017, now Pat. No. 11,775,628.

(Continued)

(51) Int. Cl.
*G06F 21/40* (2013.01)
*G06F 21/34* (2013.01)
(Continued)

(52) U.S. Cl.
CPC .............. *G06F 21/40* (2013.01); *G06F 21/34* (2013.01); *G06F 21/36* (2013.01); *G06F 21/42* (2013.01);
(Continued)

(58) Field of Classification Search
CPC .......... G06F 21/40; G06F 21/34; G06F 21/36; G06F 21/42; G06Q 20/3223; G06Q 20/3276; H04L 63/0853
See application file for complete search history.

(56) References Cited

U.S. PATENT DOCUMENTS 6,134,659 A * 10/2000 Sprong .............. G06Q 20/3674
380/255
8,732,753 B2    5/2014 Warrick
(Continued)

FOREIGN PATENT DOCUMENTS

WO    WO-2013050738 A2    4/2013

OTHER PUBLICATIONS

"U.S. Appl. No. 16/339,309, Advisory Action mailed Apr. 10, 2023", 4 pgs.
(Continued)

*Primary Examiner* — Daniel B Potratz
(74) *Attorney, Agent, or Firm* — Schwegman Lundberg & Woessner, P.A.

(57) ABSTRACT

Customizing an application on a mobile device includes storing at least a portion of customization data in a customization server that is independent of the mobile device, a user of the mobile device accessing the customization server independently of the mobile device, receiving authorization data from the customization server that enables the mobile device to securely receive customization data from the customization server, and the mobile device using the authorization data to cause the customization server to provide the customization data to the mobile device. The authorization data may be provided by postal message, email message, an SMS text message, and/or a visual code provided on a screen of a computer used to access the customization server. The user may use a computer to provide credential information to access the customization server. Customizing the appli- (Continued)

cation may allow the mobile device to access a user service on behalf of the user.

20 Claims, 7 Drawing Sheets

Related U.S. Application Data

(60) Provisional application No. 62/411,107, filed on Oct. 21, 2016, provisional application No. 62/404,130, filed on Oct. 4, 2016.

(51) Int. Cl.

| | |
|---|---|
| *G06F 21/36* | (2013.01) |
| *G06F 21/42* | (2013.01) |
| *G06F 21/57* | (2013.01) |
| *G06Q 20/32* | (2012.01) |
| *H04L 9/40* | (2022.01) |
| *H04W 12/06* | (2021.01) |
| *G06K 7/14* | (2006.01) |
| *H04W 12/77* | (2021.01) |

(52) U.S. Cl.
CPC ......... *G06F 21/57* (2013.01); *G06Q 20/3223* (2013.01); *G06Q 20/3276* (2013.01); *H04L 63/0838* (2013.01); *H04L 63/0853* (2013.01); *H04L 63/18* (2013.01); *H04W 12/06* (2013.01); *G06K 7/1417* (2013.01); *H04L 63/0869* (2013.01); *H04W 12/77* (2021.01)

(56) References Cited

U.S. PATENT DOCUMENTS

| | | | | |
|---|---|---|---|---|
| 9,774,590 | B1 * | 9/2017 | Bronshtein | ......... H04L 63/0428 |
| 9,819,673 | B1 * | 11/2017 | Johansson | ............. H04L 63/102 |
| 10,044,695 | B1 | 8/2018 | Cahill et al. | |
| 2014/0250512 | A1 | 9/2014 | Goldstone et al. | |
| 2015/0089591 | A1 | 3/2015 | Harris | |
| 2015/0319252 | A1 * | 11/2015 | Momchilov | .......... H04L 67/141 |
| | | | | 709/223 |
| 2017/0295154 | A1 | 10/2017 | Jackson et al. | |
| 2017/0346851 | A1 * | 11/2017 | Drake | ................... H04L 9/0838 |
| 2019/0228143 | A1 | 7/2019 | Guyomarc'h et al. | |
| 2020/0259825 | A1 | 8/2020 | Van Prooijen et al. | |

OTHER PUBLICATIONS

"U.S. Appl. No. 16/339,309, Advisory Action mailed Apr. 22, 2022", 3 pgs.

"U.S. Appl. No. 16/339,309, Advisory Action mailed Aug. 9, 2021", 3 pgs.

"U.S. Appl. No. 16/339,309, Corrected Notice of Allowability mailed Jun. 5, 2023", 3 pgs.

"U.S. Appl. No. 16/339,309, Final Office Action mailed Jan. 13, 2023", 16 pgs.

"U.S. Appl. No. 16/339,309, Final Office Action mailed Feb. 10, 2022", 26 pgs.

"U.S. Appl. No. 16/339,309, Final Office Action mailed May 21, 2021", 23 pgs.

"U.S. Appl. No. 16/339,309, Non Final Office Action mailed Jul. 8, 2022", 14 pgs.

"U.S. Appl. No. 16/339,309, Non Final Office Action mailed Sep. 13, 2021", 24 pgs.

"U.S. Appl. No. 16/339,309, Non Final Office Action mailed Dec. 22, 2020", 18 pgs.

"U.S. Appl. No. 16/339,309, Notice of Allowance mailed May 26, 2023", 9 pgs.

"U.S. Appl. No. 16/339,309, Response filed Mar. 13, 2023 to Final Office Action mailed Jan. 13, 2023", 11 pgs.

"U.S. Appl. No. 16/339,309, Response filed Mar. 22, 2021 to Non Final Office Action mailed Dec. 22, 2020", 9 pgs.

"U.S. Appl. No. 16/339,309, Response filed Apr. 8, 2022 to Final Office Action mailed Feb. 10, 2022", 10 pgs.

"U.S. Appl. No. 16/339,309, Response filed Apr. 12, 2023 to Advisory Action mailed Apr. 10, 2023", 9 pgs.

"U.S. Appl. No. 16/339,309, Response filed May 9, 2022 to Advisory Action mailed Apr. 22, 2022", 10 pgs.

"U.S. Appl. No. 16/339,309, Response filed Jul. 15, 2021 to Final Office Action mailed May 21, 2021", 9 pgs.

"U.S. Appl. No. 16/339,309, Response filed Aug. 23, 2021 to Advisory Action mailed Aug. 9, 2021", 9 pgs.

"U.S. Appl. No. 16/339,309, Response filed Oct. 10, 2022 to Non Final Office Action mailed Jul. 8, 2022", 9 pgs.

"U.S. Appl. No. 16/339,309, Response filed Dec. 13, 2021 to Non Final Office Action mailed Sep. 13, 2021", 12 pgs.

"International Application Serial No. PCT/IB2017/001362, International Preliminary Report on Patentability mailed Apr. 18, 2019", 9 pgs.

"International Application Serial No. PCT/IB2017/001362, International Search Report mailed Feb. 21, 2018", 3 pgs.

"International Application Serial No. PCT/IB2017/001362, Written Opinion mailed Feb. 21, 2018", (7 pgs.).

\* cited by examiner

MULTI FACTOR AUTHENTICATION USING DIFFERENT DEVICES

CROSS-REFERENCE TO RELATED APPLICATIONS

This application is a continuation of U.S. patent application Ser. No. 16/339,309, filed Apr. 3, 2019, which application is a U.S. national stage filing under 35 U.S.C. § 371 from International PCT Patent Application No. PCT/IB2017/001362 filed Oct. 4, 2017 titled "MULTIFACTOR AUTHENTICATION USING DIFFERENT DEVICES," and published as WO2018/065820, which claims priority to U.S. Provisional Patent Application No. 62/404,130 filed on Oct. 4, 2016 titled "CUSTOMIZING MOBILE APPLICATIONS" and to U.S. Provisional Patent Application No. 62/411,107 filed on Oct. 21, 2016 titled "CUSTOMIZING MOBILE APPLICATIONS," each of which are incorporated by reference herein.

TECHNICAL FIELD

This application relates to the field of customizing applications and more particularly to the field of customizing mobile applications to facilitate security, use and appearance.

BACKGROUND OF THE INVENTION

In many areas of today's mobile oriented, modern life, consumers interact with service providers through the use of mobile applications running on mobile devices (e.g. smart phones). These service providers include organizations such as banks and other financial institutions, retailers, healthcare providers and media content providers etc. These providers may deliver their services through a custom corporate mobile application that is branded with their corporate identity and personalized/customized for their users (device owners).

In many cases, it is desirable to personalize a custom corporate mobile application running on a mobile device of a user. For example, a user may have a mobile banking application that displays account balances and transactions, transfers money, etc. For security reasons, the bank may not want to allow any mobile device to access any account or to enable all transactions for a given account via mobile applications. In some cases, a banking organization may have two or more versions of a custom corporate application. Premium bank customers, or business banking customers may have their own custom mobile application that provides features above and beyond their standard offering.

Many service providers within the same industry have similar needs on their mobile applications, e.g. show bank account information; capture user registration details etc. One common identified need that service providers have is the need to be able to identify and verify their users and to let the users approve actions within the mobile applications, connected to the services offered by the service providers. Every service provider could implement a custom process for approving an action within their mobile application, e.g. "Are you sure you wish to complete the checkout?" A service provider can spend considerable efforts in the design and building of such workflows into their mobile applications.

A mechanism for securely personalizing/customizing each instance of a mobile application, for each user, may require physical access to each mobile device. For example, each user of a mobile banking application may need to visit a branch of the bank to obtain customization. This may be a secure process, but in many cases, it may be impractical or, at the very least, relatively expensive for the bank to implement (because of extra banking personnel needed) and likely to be very inconvenient for the customers (waiting for someone to be available to help, having access only during certain hours, etc.).

An alternative way to get personalized/customized information onto a users mobile devices is to point end users to an appropriate custom corporate mobile application for their needs, and allow the users to personalize/customize the mobile application remotely, over-the-air. This mechanism could remotely provide users with personalization/customization data, e.g. through wireless networks. However, providing personalization/customization data remotely can raise security issues (i.e. user B intercepts and loads remote personalization/customization information meant for user A) and can cause difficulties for users, such as when a user incorrectly loads personalization/customization information for one device on to another device. Thus custom corporate mobile applications may be difficult to write and may require significant expertise in the security field.

Accordingly, it is desirable to provide a mechanism for allowing a user to personalize/customize a mobile application remotely in a way that is secure and does not involve participation by personnel at a corresponding organization and/or does not require development of corporate custom applications.

SUMMARY OF THE INVENTION

According to the system described herein, customizing an application on a mobile device includes storing at least a portion of customization data in a customization server that is independent of the mobile device, a user of the mobile device accessing the customization server independently of the mobile device, receiving authorization data from the customization server that enables the mobile device to securely receive customization data from the customization server, and the mobile device using the authorization data to cause the customization server to provide the customization data to the mobile device. The authorization data may be provided by postal message, email message, an SMS text message, and/or a visual code provided on a screen of a computer used to access the customization server. The user may use a computer to provide credential information to access the customization server. The authorization data may be provided by the visual code on a screen of the computer and the mobile device may input the visual code using a camera of the mobile device. Customizing the application may allow the mobile device to access a user service on behalf of the user. The user service may be provided by the customization server. The customization data may include a secret key that allows the mobile device to access the user service. The user service may be banking. A template may be used to populate the customization data. Certificate pinning may be used to require that the mobile device only communication with predetermined customization servers.

According further to the system described herein, a non-transitory computer-readable medium contains software that customizes an application on a mobile device. The software includes executable code that stores at least a portion of customization data in a customization server that is independent of the mobile device, wherein a user of the mobile device accesses the customization server independently of the mobile device, executable code that receives authorization data from the customization server that enables the mobile device to securely receive customization data from the customization server, and executable code that enables the mobile device to use the authorization data to cause the customization server to provide the customization data to the mobile device. The authorization data may be provided by postal message, email message, an SMS text message, and/or a visual code provided on a screen of a computer used to access the customization server. The user may use a computer to provide credential information to access the customization server. The authorization data may be provided by the visual code on a screen of the computer and the mobile device may input the visual code using a camera of the mobile device. Executable code that customizes the application may allow the mobile device to access a user service on behalf of the user. The user service may be provided by the customization server. The customization data may include a secret key that allows the mobile device to access the user service. The user service may be banking. A template may be used to populate the customization data. Certificate pinning may be used to require that the mobile device only communication with predetermined customization servers.

A customization server is created to enables service providers to customize (personalize) a mobile phone application of an end user without requiring programming capabilities by the service provider. The customization server may provide an interface that addresses a need common to services provider organizations.

This customization server may allow a service provider to personalize and customize each instance of the mobile banking application in each mobile device of each user.

Each service provider organization may be able to customize the mobile application independently and autonomously of each other (i.e. have their own "containers" for personalization/customization data). A common customization server approvals process that is provided may tie each approval to the appropriate service provider (and it's container), such that, for example, approving a grocery checkout at Wal-Mart does not approve some other action at a different service provider.

Also, it is desirable for a service provider to be able to introduce trust into an untrusted mobile device in order to be able to electronically transact with the mobile device owner.

A mobile banking application may be customized and personalized to contain, for example, a secret key that verifies the particular user and allows encryption of communication with the bank. Other additions may include account information, indications of allowable transaction, and possibly information that changes the visual appearance of the app, such as branding information.

Note also that, in some cases, it may be useful to confirm that a user has physical possession of a mobile device prior to customizing the device (i.e. for security and logistical reasons). This device may be a device that is preregistered with the service provider.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

The system described herein provides a secure and automated mechanism for a user to request and obtain customization data for a generic app on a mobile device.

Figure 1:
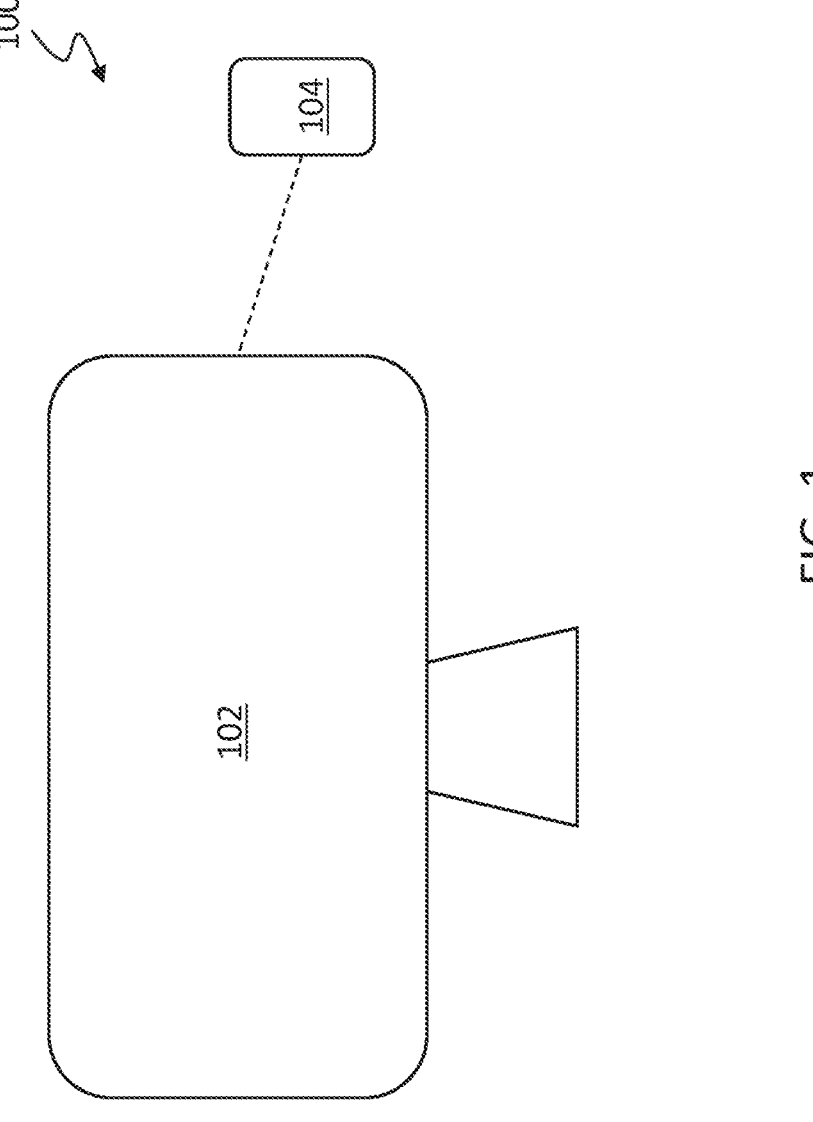
FIG. 1 is a schematic illustration showing a computer and a mobile device having a generic app that is being customized according to an embodiment of the system described herein.

Referring to FIG. 1, a diagram 100 shows a computer 102, such as a desktop or laptop computer, and a mobile device 104, such as a smartphone. The mobile device 104 may be an Android device or an IOS device and includes a generic app (not shown) that a user of the mobile device 104 desires to customize/personalize. Customizing an app on the mobile device 104 includes adding security information (e.g., user name and password, user digital certificate, user secret key, etc.) that allows the app to have secure access to data. For example, if the app facilitates a user accessing and manipulating banking information for the user, then customizing the app may include providing specific information/credentials to the app that allows the user to securely access their account through the Internet. Providing customization to the app may also include providing configuration information specific to a particular user and/or group of users and, in some cases, modifying the way the app looks on the mobile device 104 so that, for example, customization may include "branding" where the app shows information for a particular brand/company on the mobile device 104. Customization may include pre-established preferences by the users, such as alert settings (when and how to send account alerts) and/or other types of personalization/customization.

The user causes the generic app on the mobile device 104 to be customized by capturing or entering initialization parameters provided by the service provider into the generic app to begin customization that is specific to the service provider and user. The initialization parameters may be communicated to the user by the service provider in a number of ways, including postal message, email message, SMS text message, QR code, verbally spoken string of characters, etc. In many cases, the user may initially contact a service provider independently of the mobile device 104 (e.g., without using the mobile device 104)

As an example, if the generic app is being customized/ personalized for a particular bank, the user initially logs into a Web site for the particular bank using the computer 102.

The user then retrieves the initialization parameters from the Web site for the particular bank. The initialization parameters may be displayed as a visual code (not shown in FIG. 1), such as a QR code, a bar code, or similar, on the screen of the computer 102. The user uses the mobile device 104 to capture the visual code using, for example, a camera of the mobile device 104. The mobile device 104 then decodes and uses the information provided by the visual code to customize the app on the mobile device 104, as described in more detail elsewhere herein.

Figure 2:
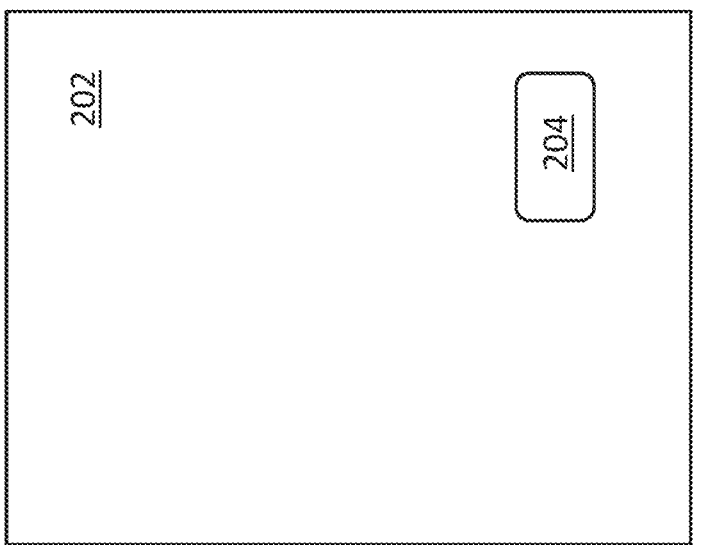
FIG. 2 is a schematic illustration showing a screen with a customization button thereon according to an embodiment of the system described herein.

Referring to FIG. 2, a screen 202 of a Web site for a service/business corresponding to the generic app being customized/personalized is provided in response to a user accessing the Web site. The screen 202 is used in connection with customizing the generic app on a mobile device of the user. In some cases, the screen 202 may only be available in response to the user providing appropriate credentials (e.g., user name and password). In other instances, the screen 202 may be available without the user initially providing any credentials, although the user may be subsequently required to enter credential information (or similar) at some point prior to customization of the generic app.

The screen 202 may include a customize button 204 that the user actuates to customize the generic app on the mobile device of the user. In other instances, the button 204 may be replaced by a menu selection, a link (i.e., an HTML link), etc. The user actuates the button 204 (or similar) while the mobile device of the user is in proximity to the user. In an embodiment herein, the system may provide the user with a pre-determined amount of time to complete the customization process (described elsewhere herein) prior to timing out and requiring the user to begin the customization process again.

Figure 3:
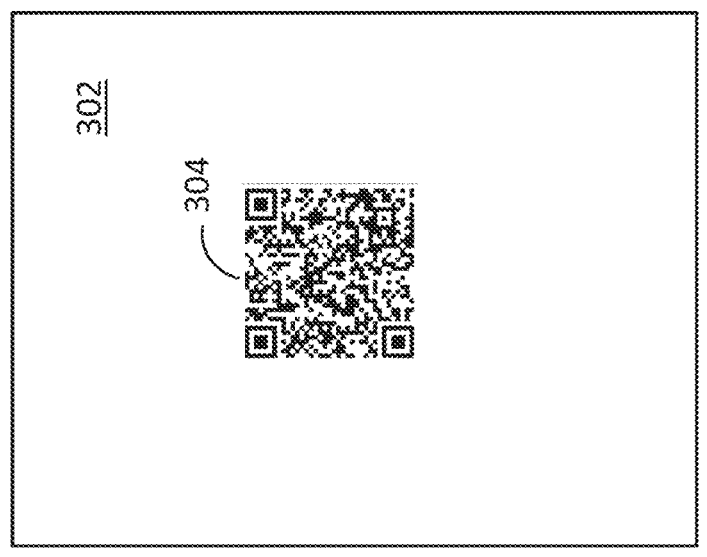
FIG. 3 is a schematic illustration showing a screen with a visual code thereon according to an embodiment of the system described herein.

Referring to FIG. 3, a screen 302 is shown with a visual code 304 that is used by the user to customize/personalize the generic app on the mobile device of the user. The screen 302 and the visual code 304 are provided in response to the user actuating the button 204 (or similar). As described elsewhere herein, the user uses the mobile device to photograph the visual code 304 to provide information to the mobile device that is used for customization of a generic app provided thereon.

Figure 4:
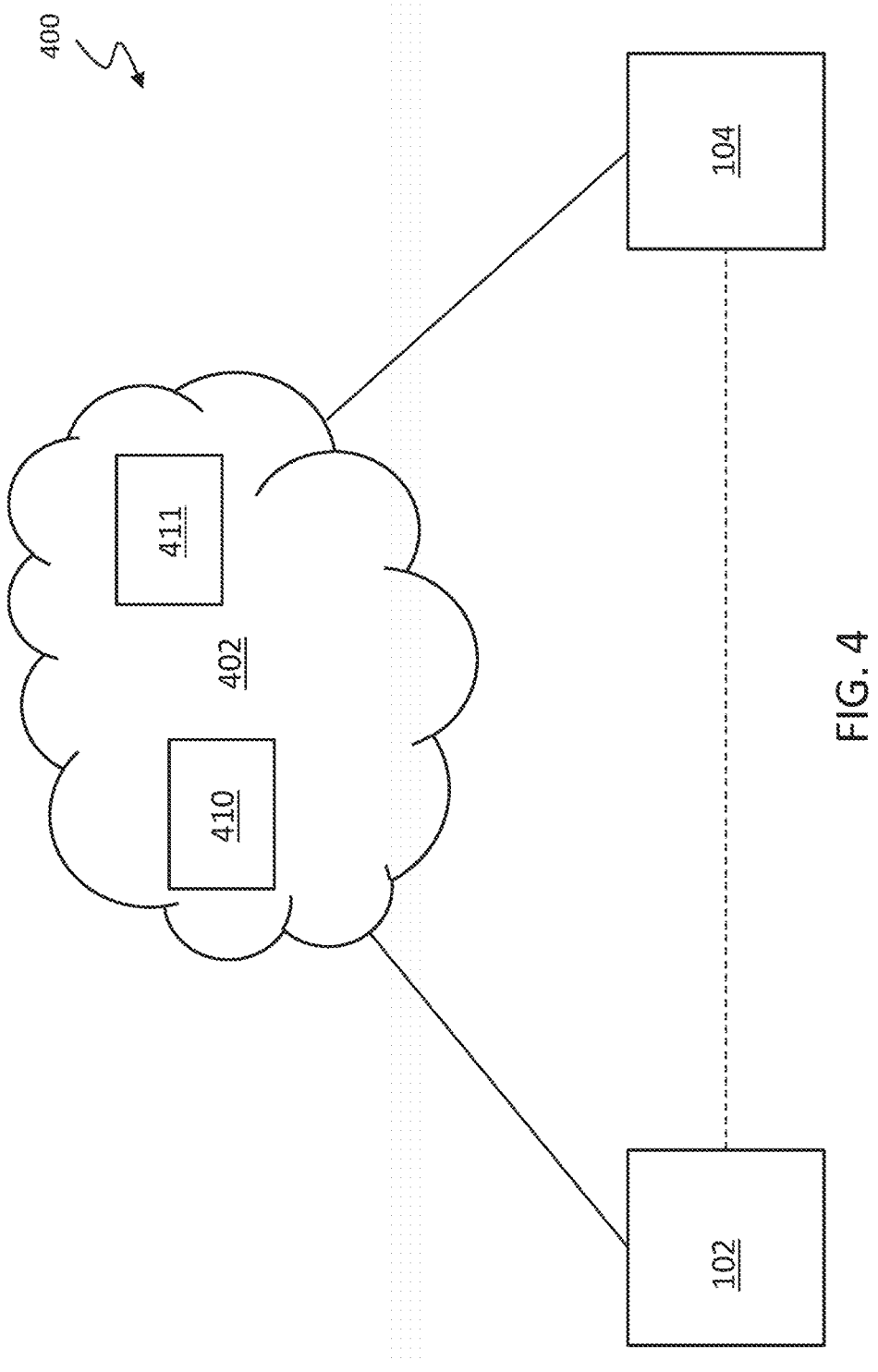
FIG. 4 is a schematic illustration showing a computer, a mobile device, and a service provider according to an embodiment of the system described herein.

Referring to FIG. 4, a diagram 400 shows the computer 102 and the mobile device 104 coupled to a service provider 402. In an embodiment herein, the service provider 402 may be accessible from the World Wide Web, although in other embodiments, it is possible to make the service provider 402 not be accessible from the World Wide Web but, instead, have the service provider 402 be accessible only privately, either through a private network, via one or more direct connections, etc. Thus, connections from the computer 102 and the mobile device 104 to the service provider 402 represent accessing the service provider 402 through the World Wide Web, via a private network, direct connections, etc. The service provider 402 may include a business application, 410 (e.g. a banking application) and a server provider customization server 411 for customization.

The service provider customization server 411 stores data used for customization (personalization) of a generic app on a mobile device, including specific customization data, branding data, credential information, security information, such as keys, certificates, etc. In an embodiment herein, a template is used where the service provider modifies the template to include visual items such as a service label, a service background color, a logo (bitmap image), a foreground color, etc. The customization server 411 also provides processing for determining whether and which customization data to provide based on which "container" data is associated with as well as possibly security processing to confirm security information used in connection with requesting and authorizing customization of a generic app. As described in more detail elsewhere herein, once the mobile device 104 has photographed (or similar) the visual code on the computer 102, the mobile device 104 then communicates with the service provider customization server 411 to provide information corresponding to the visual code to the service provider 402 and to receive the customization information from the service provider customization server 411.

Figure 5:
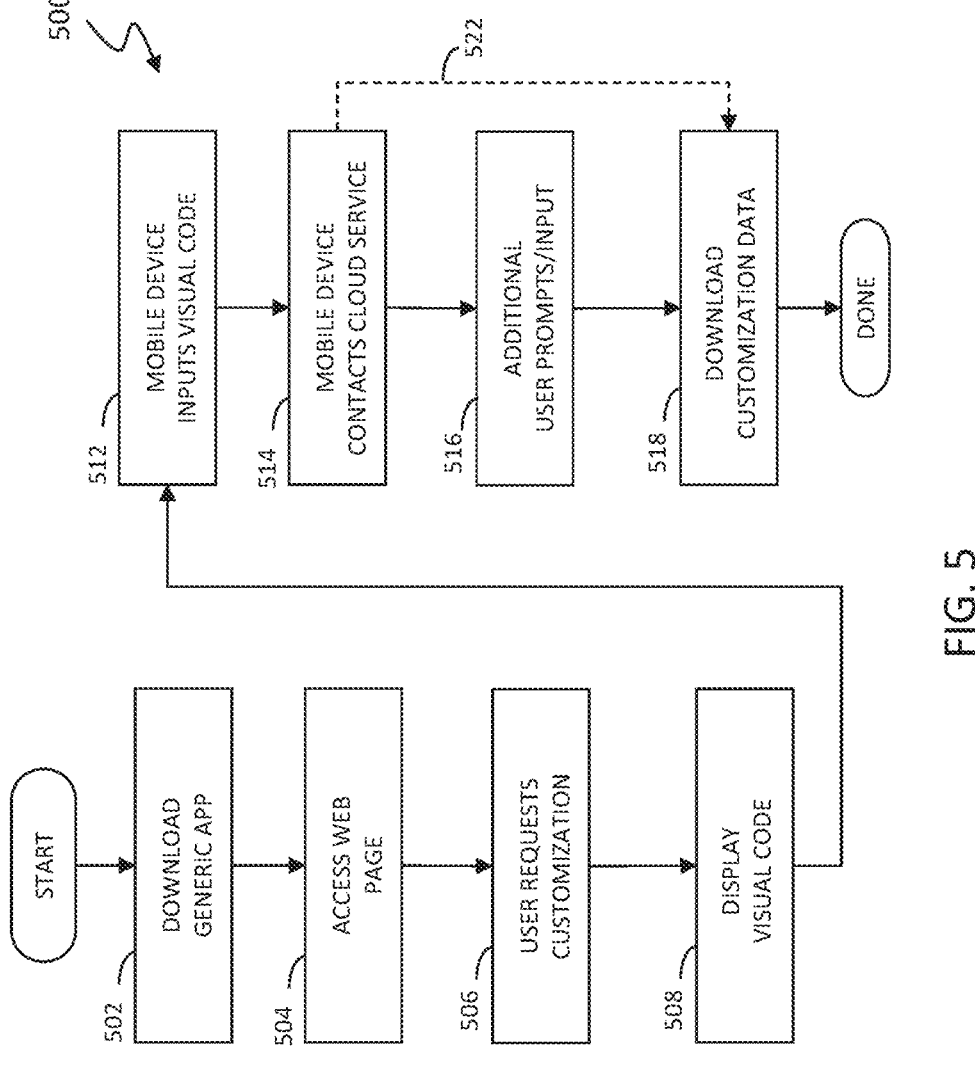
FIG. 5 is a flow diagram illustrating processing performed in connection with customizing a generic app on mobile device according to an embodiment of the system described herein.

Referring to FIG. 5, a flow diagram 500 illustrates a user customization a generic app on a mobile device. At a first step 502, the user downloads the generic app onto the mobile device. The step 502 may be performed using conventional app download mechanisms, such as, for example, accessing the generic app with an iOS device using the Apple app store. In some instances, it may also be possible to download the generic app onto the mobile device from the World Wide Web. Following the step 502 is a step 504 where the user accesses an appropriate Web page for retrieving the initialization parameters and customizing the generic app, as described elsewhere herein. In some embodiments, the user provides at least some credential information in order to be able to access the Web page or programmatic service at the step 504. In other cases (e.g. a two-step customization process) the user does not need to provide any credential information to access the Web page at the step 504, in which case the user may be required to provide credential information at a later time but prior to customization of the generic app. The user may access the Web page at the step 504 independently of the mobile device (e.g., without using the mobile device at all).

In some embodiments, the Web page accessed at the step 504 may be for a generic service provider that redirects the user to a different Web page for a specific service provider. For instances, a trusted broker may provide redirection to different, possibly unrelated, service providers. The user would access the Web page for the trusted broker at the step 504 and choose one of the service providers presented on the Web page. After making a choice, the user would then be redirected to a Web page for the specific service provider. In some cases, certificate pinning may be used to enhance security by requiring that the mobile device only communicates with predetermined service providers/trusted brokers.

Following the step 504 is a step 506 where the user selects (actuates) customization at the Web page by, for example, clicking a button. Note that any other mechanism may be used to allow a user to actuate at the Web page to start customization of the generic app, such as menu selection, an HTML link, etc. The user may actuate the Web page at the step 506 independently of the mobile device (e.g., without using the mobile device at all). Following the step 506 is a step 508 where a visual code is displayed on a screen of the computer used to access the Web page, as described elsewhere herein. Following the step 508 is a step 512 where the user photographs (or similar) the visual code. As discussed elsewhere herein, the visual code is an encoding of the initialization parameters and includes information that is used to identify and authenticate the request e.g. a one-time password value (or similar) to provide security.

Following the step 512 is a step 514 where the mobile device connects with the service provider customization server (discussed elsewhere herein) that provides the customization information for the mobile device. Connecting with the service provider customization server at the step 514 includes the mobile device providing the service provider customization server with some or all of the information that the mobile device received from the initialization parameters (which may be presented as a visual code) as well as possibly other information, such as a serial number, user ID, etc. associated with the mobile device. Following the step 514 is a step 516 where the user is prompted to enter additional information/credentials. In some cases, the service provider customization server may require additional verification information from the user (e.g., a password, a physiological or behavioral characteristic such as a fingerprint biometric, voice recognition, facial recognition, etc.). It is also possible for the additional information to include additional configuration information that can be applied in the app customization, such as asking the user for a nearest/preferred branch of a particular bank. Following the step 516, control transfers to a step 518 where the mobile device downloads the customization data from the service provider customization server. Following the step 518, processing is complete.

In some embodiments, it may not be necessary/desirable to request that the user provide additional information at the step 516 after the mobile device connects to the service provider customization server at the step 514. For example, in some embodiments, it is possible to have the user provide all necessary/desirable information for credentials, security, configuration, etc. in connection with accessing the Web page at the step 504, discussed above. In such a case, it may be possible to forgo the step 516 altogether, which is indicated by an alternative path 522 that provides that the step 518 immediately follows the step 514.

Figure 6:
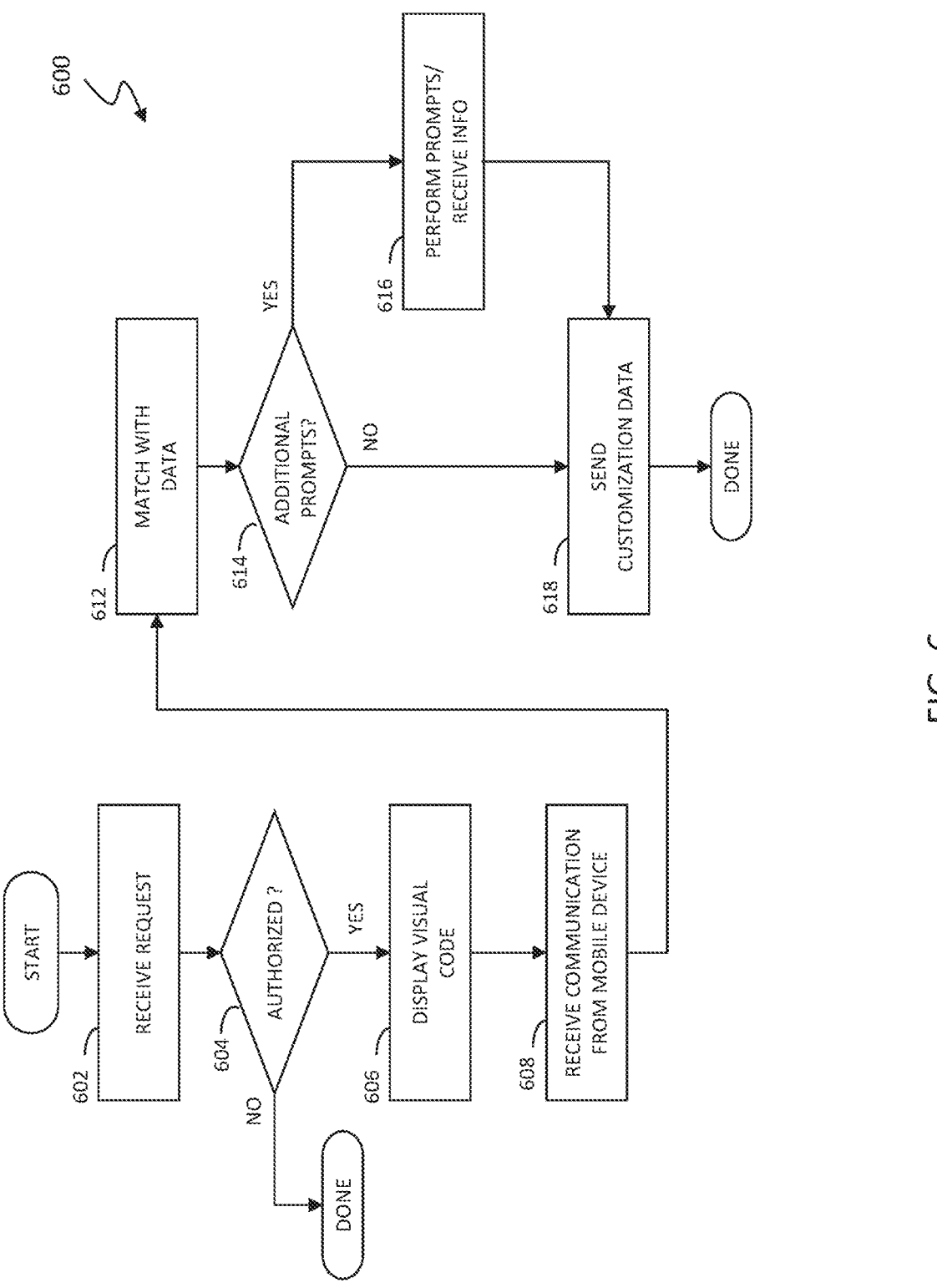
FIG. 6 is a flow diagram illustrating processing performed by a service provider in connection with receiving a request to customize a generic app on a mobile device according to an embodiment of the system described herein.

Referring to FIG. 6, a flow diagram 600 illustrates steps performed at the service provider customization server 411 (not shown in FIG. 6) in connection with servicing a request for customization of a mobile device. Processing begins at a first step 602 where the service provider receives a request for customization. Following the step 602 is a test step 604 where the service provider customization server determines if the request and/or user are authorized for customization. In some cases, the test at the step 604 may turn, at least in part, on the circumstances of the request. For example, for a U.S. bank, requests from computers that are located outside of North America may not be authorized so as to provide protection against fraud. The test at the step 604 may also turn on an identity of the user making the request (e.g., bank customer or not) and/or the particular mobile device (e.g., device with particular minimum technical capability, pre-registered device, etc.).

If it is determined at the test step 604 that the user/device is not authorized, then processing is complete and the service provider customization server takes no further steps to provide customization for the mobile device of the user. Otherwise, if the user/device is authorized, control transfers from the test step 604 to a step 606 where the service provider causes the initialization parameters (e.g., the QR code 304, discussed above) to be displayed. Following the step 606 is a step 608 where the service provider customization server receives a communication from the mobile device following the mobile device capturing the initialization parameters (described elsewhere herein). The communication from the mobile device may include information extracted from the initialization parameters, such as the service/application, user identity, a one time password (or similar), and possibly other data, that allows mobile and server to establish a shared key.

Following the step 608 is a step 612 where the system matches the information received at the step 608 with information already stored at the service provider. For example, if the mobile device is being customized for a bank app, processing at the step 612 may include matching the user with specific user accounts and perhaps also with a pre-determined list of allowed transactions and limits. Other processing at the step 612 may include matching the particular device with particular capabilities. For example, different customization capabilities may be provided depending on whether the mobile device is a tablet or a smartphone. Note also that additional checks may be performed at the step 612, including, for example, determining if the specific mobile device is authorized (not on a black list), determining if a phone number for the mobile device matches a known phone number for the user, is the location of the device proximate to a known address/location for the user, has the device been used previously by the user; whether the device is jaibroken or rooted; whether the device contains a secure element (smart card or TEE); whether the device has a certain OS version etc. In some instances, if one or more of the additional check are failed, customization may be terminated, which is not shown in FIG. 6.

Following the step 612 is a test step 614 where it is determined if the user/device will be prompted for additional data. For example, once a specific mobile device has been identified (e.g., by serial number), the service provider may prompt the device for an expected value, such as a nonce encrypted with a secret key, to confirm the authenticity of the device. Other prompted information may include, for example, querying the user for a favorite/closest bank branch. If it is determined at the test step 614 that additional data is needed from the user and/or the mobile device, then control transfers from the test step 614 to a step 616, where the additional data is obtained. Note that, in some cases, the additional data obtained at the step 616 includes security data and failure to provide appropriate data (e.g., a digital certificate, a user password, etc.) could result in termination of the customization process, which is not shown in FIG. 6.

Following the step 616 or following the step 614 if prompting is not performed, is a step 618 where the service provider sends customization data to the mobile device. In some instances, the customization data may be specific for a single user. In other cases, the customization data may correspond to data provided to a particular group to which the user belongs (e.g., Massachusetts banking customers). The customization data may include, for example, one time password configuration data (i.e., a seed), a private key generated at the service provider customization server 411, a private key and a digital certificate containing the corresponding public key, a proprietary identity, such as a SEOS key, etc. The customization data is optionally protected for integrity and confidentiality using shared keys established in a previous step of the process. The customization data could also include graphical personalization/customization, such as logos, icons, and textual changes to titles, buttons, menus, etc. Following the step 618, processing is complete.

Figure 7:
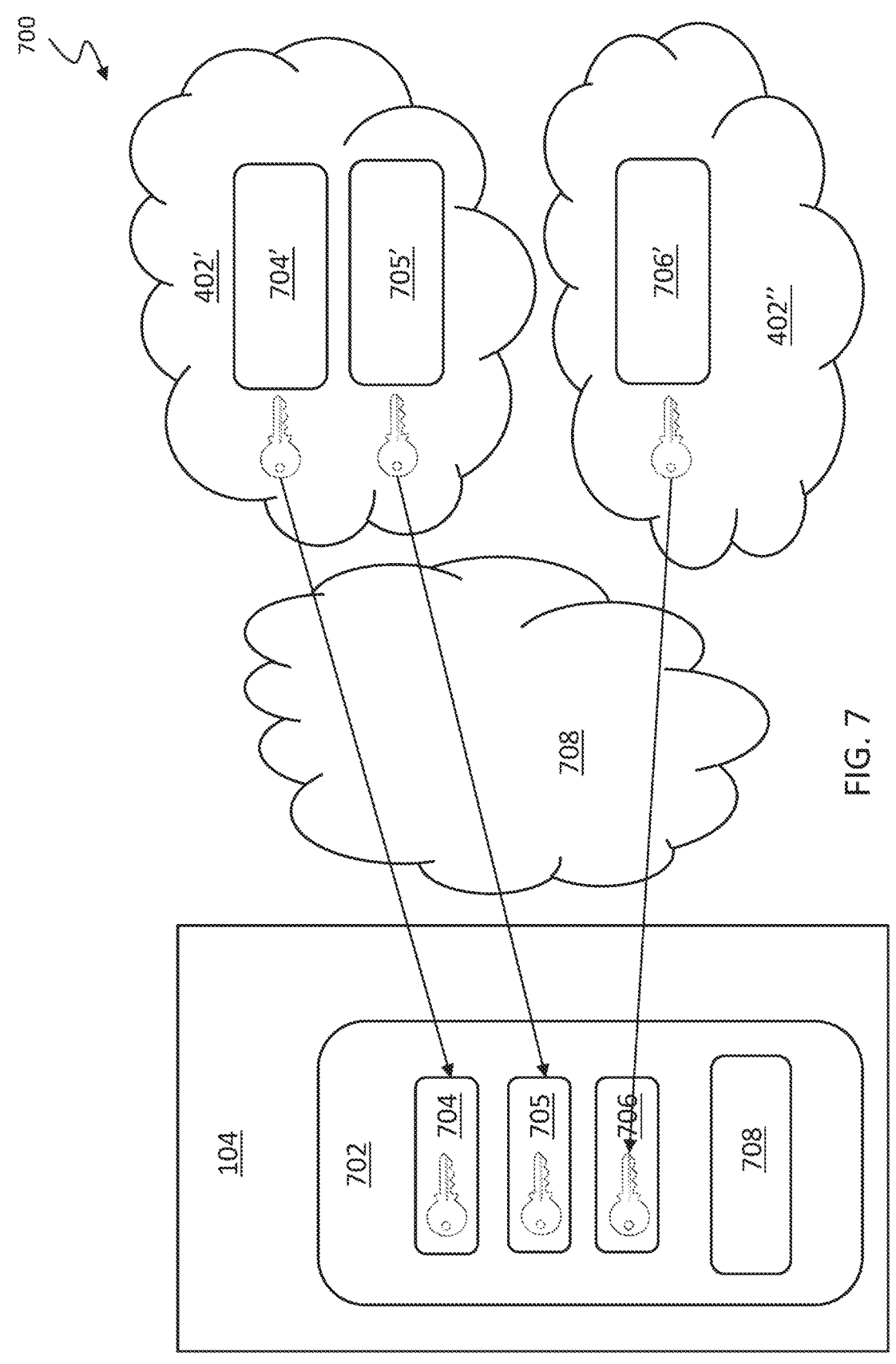
FIG. 7 is a schematic diagram showing a mobile device being customized using two separate service providers according to an embodiment of the system described herein.

Referring to FIG. 7, a diagram 700 illustrates the mobile device 104 having an app 702 that includes a plurality of client containers 704-706 and executable code 708. Each of the client containers 704-706 includes separate customization for different services. Some or all of the client containers 704-706 may be customized by different service providers. Thus, the app 702 is essentially customized from different, possibly unrelated, services which are possibly from different cloud services. The diagram 700 shows the client containers 704, 705 being customized by a first cloud service 402' having a first set of customization data 704' for the client container 704 and a second set of customization data 705' for the client container 705. The client container 706 is customized by a second cloud service 402" having a set of customization data 706'. Note that the executable code 708 of the app 702 is not effected by the client containers 704-706 or the cloud services 402', 402". In an embodiment herein, the executable code 702 may be generic to all services and customizations, but the user is presented with what looks like a different app depending upon the particular customization. Thus, for example, the user could download a generic banking app that could be separately customized for different, unrelated, banks so that the user has a different app experience for each of the banks even though the user is running the same generic executable code for all the banks.

Different keys are used for transmission between the client containers 704-706 and the sets of customization data 704'-706'. In an embodiment herein, keys used by each of the containers 704-706 and a corresponding one of the sets of customization data 704'-706' are exclusive and known only to communicating entities. Thus, for example, the keys (or single symmetric key) used by the client container 704 and in connection with the customization data 704' are known only to the first cloud service 402' and the client container 704 and are not interchangeable or replaceable with any other keys. This prevents another cloud service, such as the cloud service 402", from improperly updating an unrelated client container, such as the client container 704.

In some embodiments, the mobile device 104 communicates with a single cloud service 708 which passes communication to an appropriate one of the cloud services 402', 402". Thus, the mobile device 104 does not need to have direct access to the cloud services 402', 402" but, instead, relies on the cloud service 708 to relay communications therefor. In an embodiment herein, the cloud service 708 does not have access to data in the client containers 704-706 and does not have access to any of the keys used to encrypt data communicated between the mobile device 104 and the cloud services 402', 402". Thus, even though the cloud service 708 relays data, the cloud service 708 does not have access to any of the data being relayed.

Figure 8:
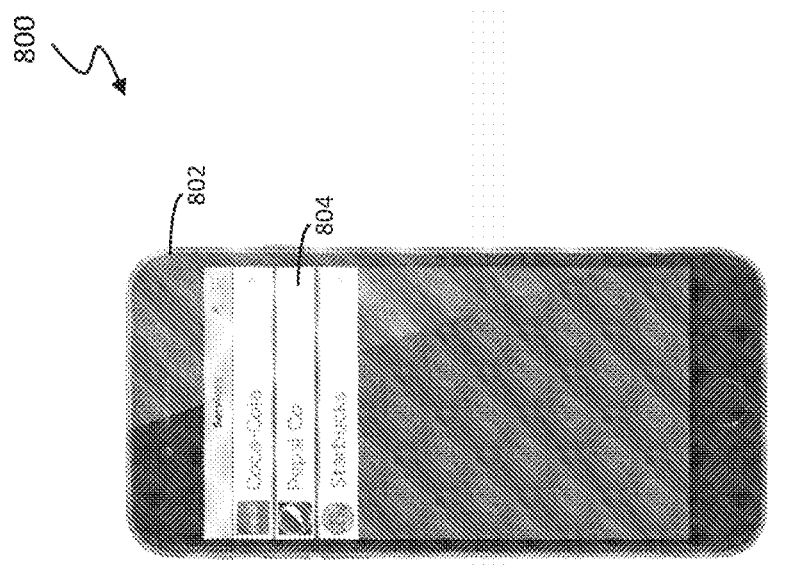
FIG. 8 is a schematic diagram showing a mobile device running an app with a plurality of client containers according to an embodiment of the system described herein.

Referring to FIG. 8, a diagram 800 shows a mobile device 802 running an app 804 having a plurality of client containers. As discussed elsewhere herein, each of the client containers of the app provide customization of different, possibly unrelated, services. Some or all of the client containers may be customized by different cloud services. Thus, a user may run the app 804 on the mobile device 802 and select from among the client containers that have been customized, as described elsewhere herein.

The system described herein may be provided without the need for development of custom application code.

Various embodiments discussed herein may be combined with each other in appropriate combinations in connection with the system described herein. Additionally, in some instances, the order of steps in the flowcharts or flow diagrams may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only.

What is claimed is:

1. A method for customizing an application on a mobile device, the application being generic to at least one of a plurality of service providers or a plurality of users, the method comprising:

storing customization data in a customization server that is independent of the mobile device, wherein the customization data, when used to modify the application, changes the application to a customized application that is specific to at least one of a given service provider of the plurality of service providers or a user of the mobile device;

in response to the user of the mobile device initiating customization of the application by contacting the customization server through an access channel other than the application, providing authorization data to the user from the customization server, wherein the authorization data enables the mobile device to securely receive the customization data from the customization server; and receiving the authorization data from the mobile device and causing the customization server to provide the customization data to the mobile device, wherein the customization data enables the mobile device to change the application to the customized application.

2. The method, according to claim 1, wherein the authorization data is provided by at least one of: postal message, email message, an SMS text message, or a visual code provided on a screen of a computer used to contact the customization server.

3. The method, according to claim 2, wherein the user uses a computer separate from the mobile device to contact the customization server to initiate customization of the application.

4. The method, according to claim 2, wherein the authorization data is provided by the visual code on the screen of the computer and the mobile device receives the visual code using a camera of the mobile device.

5. The method, according to claim 1, wherein customizing the application enables the mobile device to access a user service on behalf of the user.

6. The method, according to claim 1, wherein the user of the mobile device initiating customization of the application by contacting the customization server through an access channel other than the application comprises the user of the mobile device contacting the customization server without using the mobile device.

7. The method, according to claim 5, wherein the user service is banking.

8. The method, according to claim 1, wherein certificate pinning is used to require that the mobile device only communicate with predetermined customization servers.

9. A non-transitory computer-readable medium containing executable code for customizing an application on a mobile device, the application being generic to at least one of a plurality of service providers or a plurality of users, the executable code, when executed by at least one processor, causing the processor to:

store customization data in a customization server that is independent of the mobile device, wherein the customization data, when used to modify the application, changes the application to a customized application that is specific to at least one of a given service provider of the plurality of service providers or a user of the mobile device;

in response to the user of the mobile device initiating customization of the application by contacting the customization server through an access channel other than the application, providing authorization data to the user from the customization server, wherein the authorization data enables the mobile device to securely receive customization data from the customization server; and receive the authorization data from the mobile device and cause the customization server to provide the customization data to the mobile device, wherein the customization data enables the mobile device to change the application to the customized application.

10. The non-transitory computer-readable medium, according to claim 9, wherein the authorization data is provided by at least one of: postal message, email message, an SMS text message, or a visual code provided on a screen of a computer used to contact the customization server.

11. The non-transitory computer-readable medium, according to claim 10, wherein the access channel comprises a computer separate from the mobile device.

12. The non-transitory computer-readable medium, according to claim 9, wherein changing the application to the customized application enables the mobile device to access a user service on behalf of the user.

13. The non-transitory computer-readable medium, according to claim 9, wherein the user of the mobile device initiating customization of the application by contacting the customization server through an access channel other than the application comprises the user of the mobile device contacting the customization server without using the mobile device.

14. The non-transitory computer-readable medium, according to claim 12, wherein the customization data includes a secret key that enables the mobile device to access the user service.

15. The non-transitory computer-readable medium, according to claim 12, wherein the user service is banking.

16. A method for customizing an application on a mobile device, the method comprising:

downloading the application to the mobile device, the application being generic to at least one of a plurality of service providers or a plurality of users;

initiating customization of the application by contacting a customization server through an access channel other than the application, the customization server being independent of the mobile device and storing customization data, wherein the customization data, when used to modify the application, changes the application to a customized application that is specific to at least one of a given service provider of the plurality of service providers or a user of the mobile device;

in response to contacting the customization server, receiving authorization data from the customization server, wherein the authorization data enables the mobile device to securely receive the customization data from the customization server; and providing the authorization data from the mobile device to the customization server and, in response, receiving the customization data from the customization server, wherein the customization data enables the mobile device to change the application to the customized application.

17. The method, according to claim 16, wherein initiating customization of the application by contacting the customization server through an access channel other than the application comprises the user of the mobile device contacting the customization server without using the mobile device.

18. The method, according to claim 16, wherein receiving the authorization data from the customization server comprises receiving the authorization data by at least one of: postal message, email message, an SMS text message, or a visual code provided on a screen of a computer used to contact the customization server.

19. The method, according to claim 16, wherein the authorization data is received via a visual code on a screen of a computer used to contact the customization server and the method further comprises receiving the visual code using a camera of the mobile device.

20. The method, according to claim 16, wherein customizing the application enables the mobile device to access a user service on behalf of the user.

* * * * *